(12) United States Patent
Graham et al.

(10) Patent No.: US 7,543,793 B2
(45) Date of Patent: Jun. 9, 2009

(54) GENERATOR SET TANK AND ENCLOSURE WITH ADJUSTABLE MOUNTING SYSTEM

(76) Inventors: Wayne A. Graham, S80 W20570 Tyler Dr., Muskego, WI (US) 53150; Jeremy Zurich, 1216 Memorial Dr., Apt. 14, Milwaukee, WI (US) 53217; David Kranz, 401 Cambridge St., Waukesha, WI (US) 53188

( * ) Notice: Subject to any disclaimer, the term of this patent is extended or adjusted under 35 U.S.C. 154(b) by 656 days.

(21) Appl. No.: 11/313,507

(22) Filed: Dec. 21, 2005

(65) Prior Publication Data

US 2007/0152126 A1    Jul. 5, 2007

(51) Int. Cl.
*F16M 3/00*    (2006.01)
(52) U.S. Cl. ..................... 248/639; 290/1 A
(58) Field of Classification Search .............. 290/1 A
See application file for complete search history.

(56) References Cited

U.S. PATENT DOCUMENTS

| | | | | |
|---|---|---|---|---|
| 1,628,620 A * | 5/1927 | Steen | .................. | 248/639 |
| 2,004,405 A * | 6/1935 | Gumpper | .................. | 290/1 A |
| 2,164,187 A * | 6/1939 | Clark | .................. | 290/31 |
| 2,204,877 A * | 6/1940 | Anderson | .................. | 248/639 |
| 2,296,184 A * | 9/1942 | Riise | .................. | 248/639 |
| 2,395,415 A | 2/1946 | Maier | | |
| 4,212,446 A | 7/1980 | Domanick et al. | | |
| 4,572,474 A * | 2/1986 | Derlich | .................. | 248/639 |
| 4,660,799 A | 4/1987 | Butland | | |
| 5,085,396 A | 2/1992 | Mansson | | |
| 7,028,970 B1 * | 4/2006 | Wiseman | .................. | 248/669 |
| 2006/0037954 A1 * | 2/2006 | Silvestro | .................. | 219/133 |
| 2008/0042625 A1 * | 2/2008 | Konop et al. | .................. | 322/1 |

* cited by examiner

*Primary Examiner*—Joseph Waks
(74) *Attorney, Agent, or Firm*—Boyle Fredrickson S.C.

(57) ABSTRACT

The present invention is a generator set tank and enclosure that includes a number of adjustable generator support assemblies that enable the tank and enclosure to be configured for use with generators of various sizes. The support assemblies include mounting channels configured to be secured to the tank in a variety of locations, and each channel includes a number of support platforms therein which can be adjustably positioned on the channels to further adjust the configuration of the support assemblies. Also, the tank and enclosure are configured with multiple fittings, attachments, and access points in order to enable both the tank and enclosure to be fully customizable for use with generators of various sizes.

21 Claims, 6 Drawing Sheets

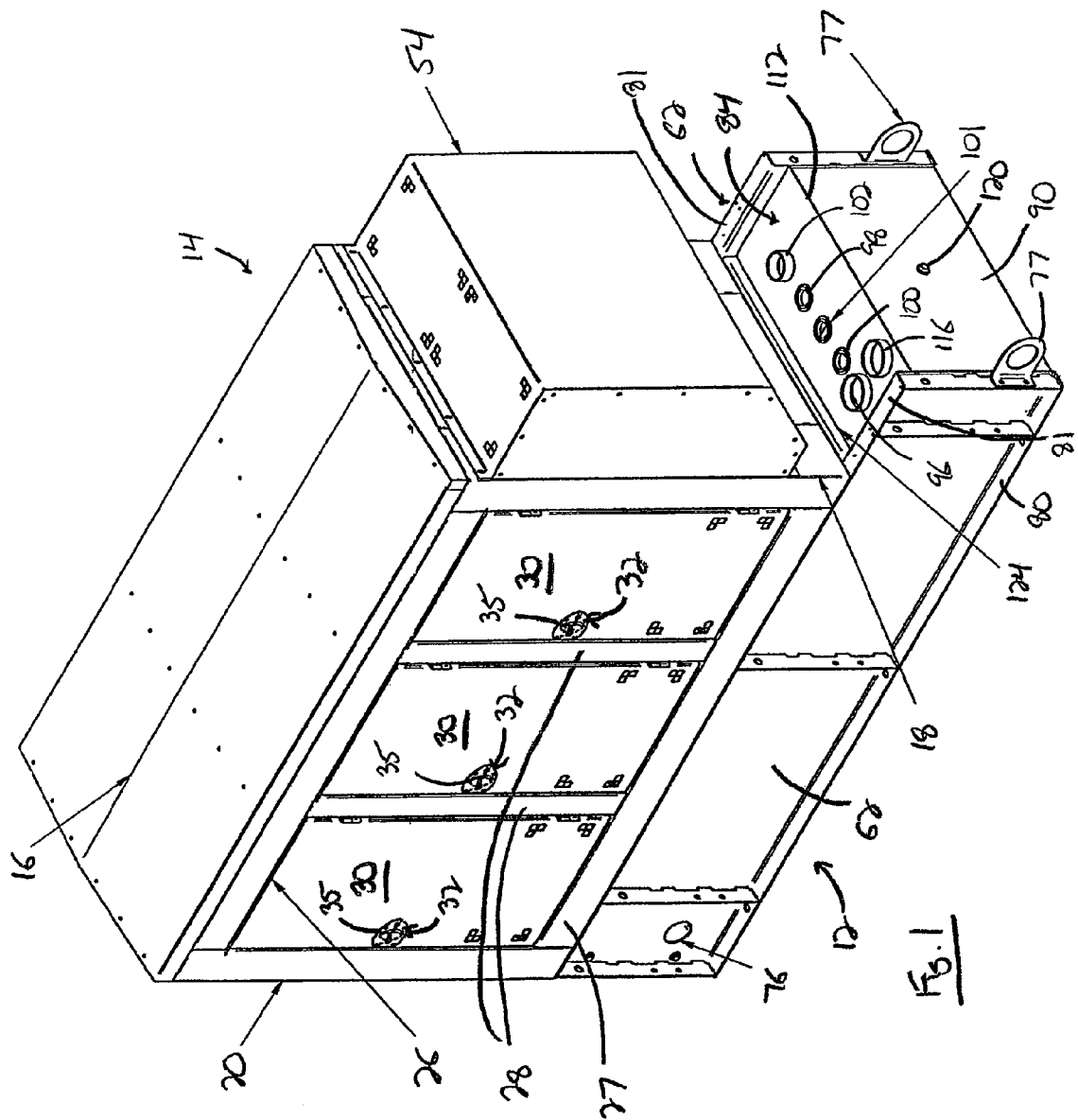

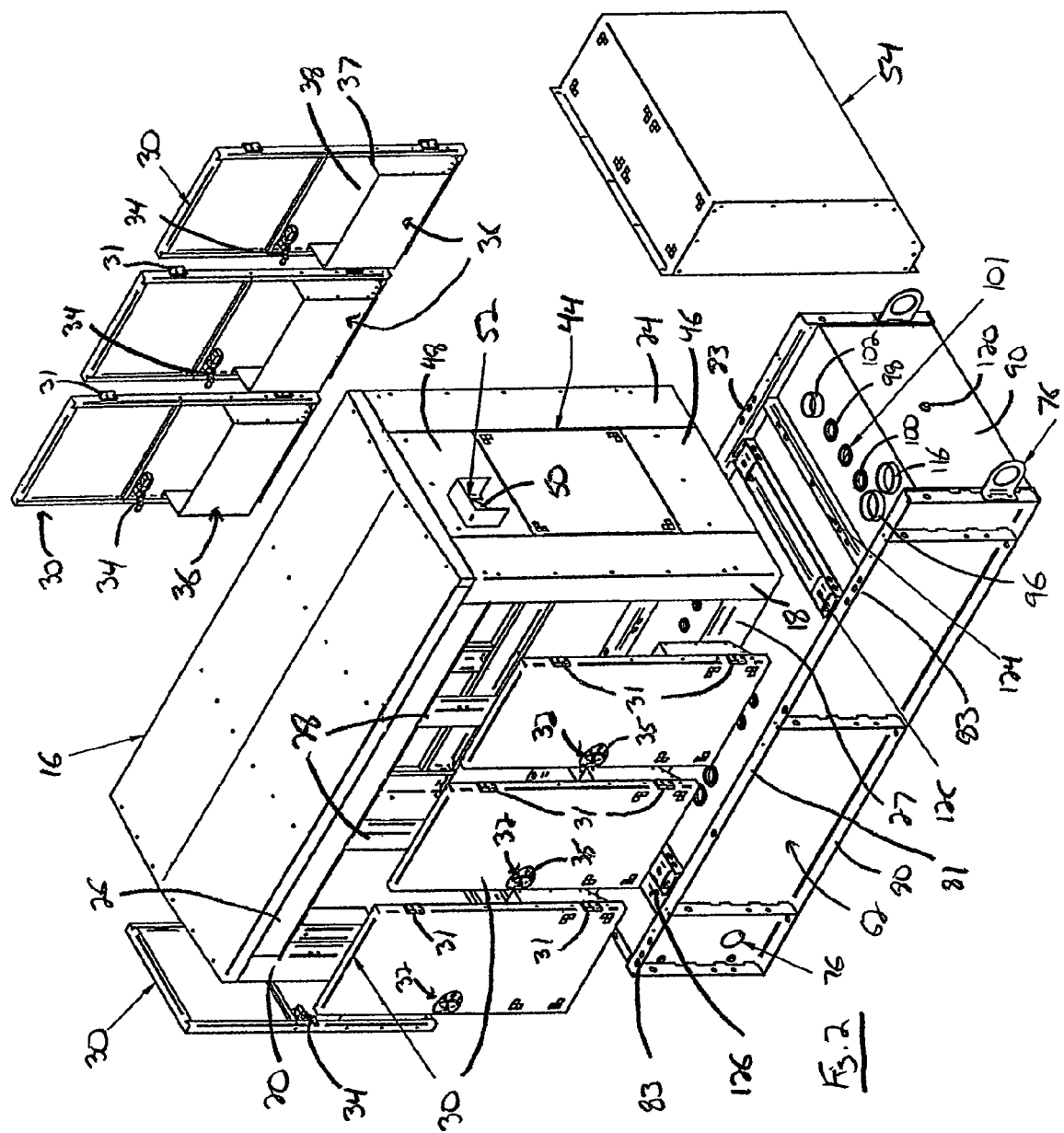

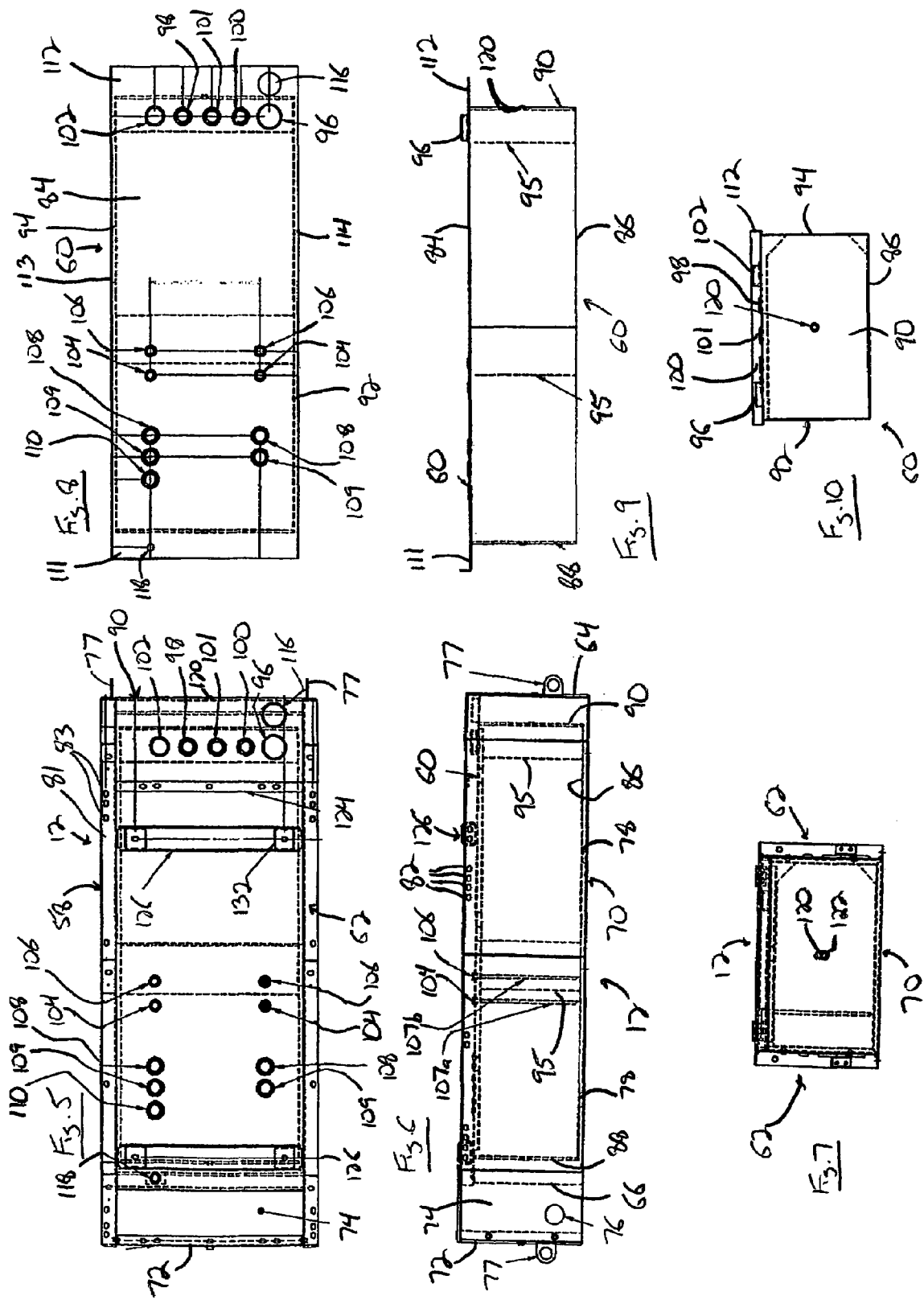

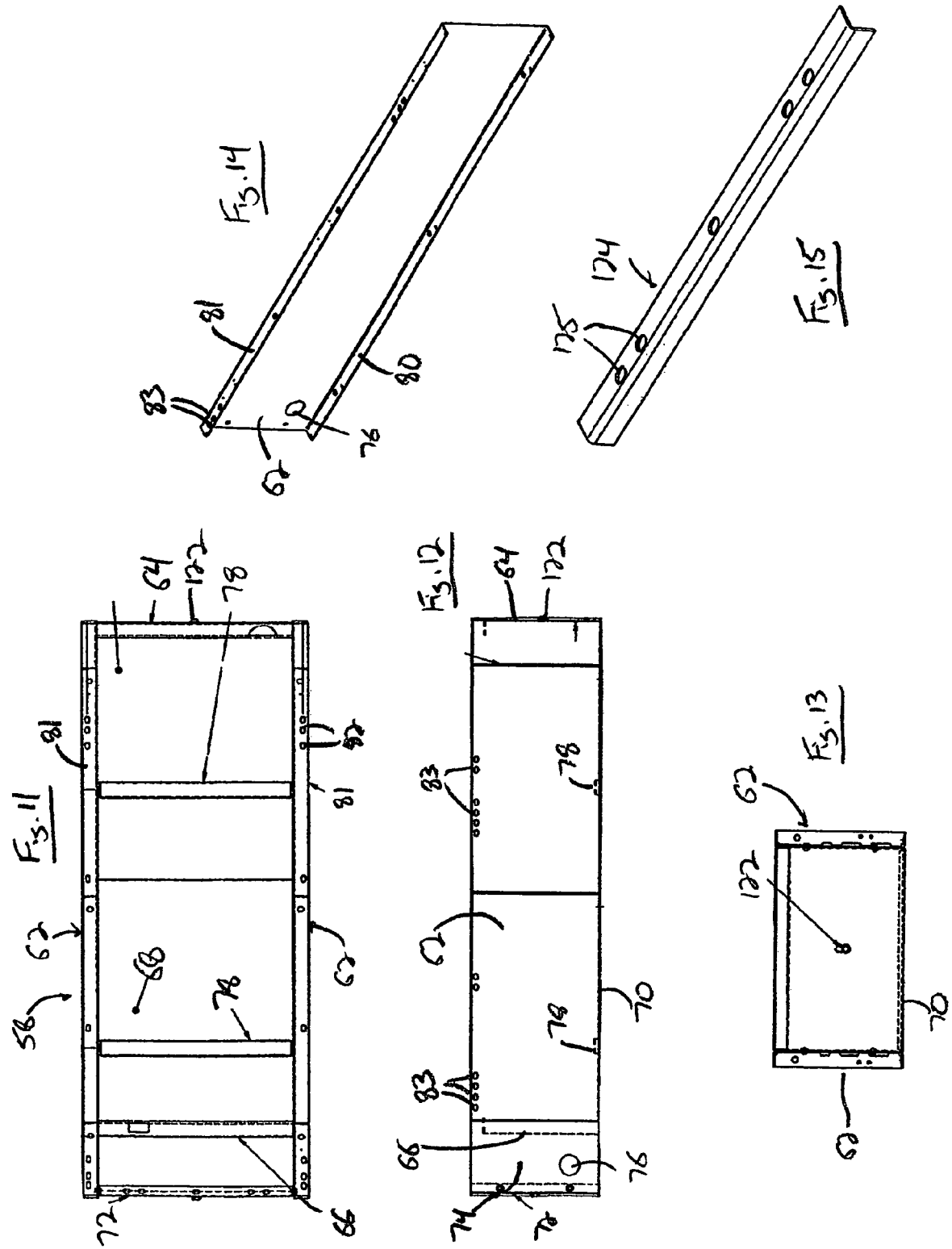

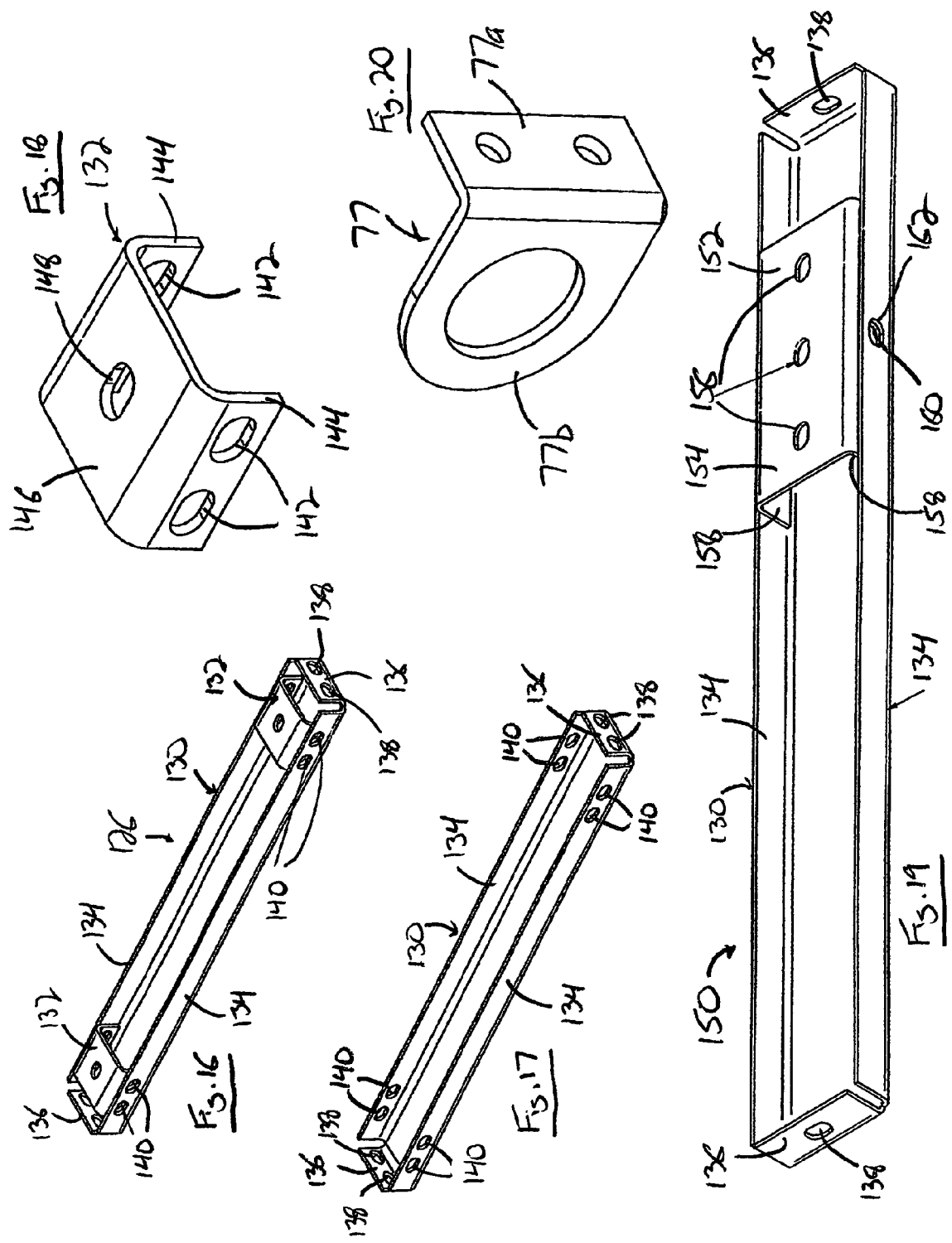

GENERATOR SET TANK AND ENCLOSURE WITH ADJUSTABLE MOUNTING SYSTEM

FIELD OF THE INVENTION

The present invention relates to generator sets, and more specifically to a generator set tank and enclosure including an adjustable mounting system for securing generators and generator components of varying sizes to the tank and enclosure.

BACKGROUND OF THE INVENTION

Generator sets are often utilized to provide mobile power sources for a variety of purposes. The generator sets normally include a fuel tank forming the base of the generator set, and an enclosure attached over an upper end of the tank. The enclosure provides a protective cover for the generator, motor and radiator that are each connected to the tank and which form the operating parts of the generator set. The size and configuration of the tank and the enclosures for the generator sets can be made to accommodate any size generator desired, such that they can widely vary in size.

Due to the number of different sizes of generators which can be utilized in forming a generator set, the enclosures and tanks within which the generators are mounted to form the generator set must be designed specifically for use with a single size of generator in order for the tank and enclosure to accommodate the various fittings and components of the generator. The necessity for a single tank and enclosure for use with a single generator requires that a significant amount of material be available in order to construct the tanks and enclosures for each size generator as necessary. Further, having the necessary raw materials, and number and type of components for constructing a tank and enclosure for a particular generator is often cost-prohibitive due to the costs for the materials and for storing the materials until such time as they are needed to create the specific tank and enclosure.

Therefore, it is desirable to develop a generator set tank and enclosure that can be adapted to fit a range of generator sizes, such that a single tank and enclosure may be utilized with generators of different sizes.

BRIEF SUMMARY OF THE INVENTION

According to a primary aspect of the present invention, a generator set tank and enclosure is provided in which the generator tank includes mounting members adjustably positioned on the tank. The mounting members can be secured to the tank in a variety of locations in order to position the mounting members at varying locations to support generators of varying sizes thereon.

According to another aspect of the present invention, the generator set tank includes a number of duplicate fittings disposed on the tank that are each capable of being connected to generators of different sizes. The fittings are located adjacent one another and allow for the positioning of the mounting members at various locations on the tank such that at least one of the fittings is exposed in a location to which it can be secured to a generator of a particular size.

According to still another aspect of the present invention, the enclosure that is securable to the tank over the generator includes a number of doors disposed around the periphery of the enclosure that provide a number of access points to the different operating components of the generator, regardless of the size of the generator. The doors can be located on each side of the enclosure, in order to accommodate generators of various sizes and allow access to all portions of the generators.

According to still a further aspect of the present invention, the enclosure includes a number of duplicate knockout sections and vent openings that can be used depending upon the size of the particular generator attached to the tank and positioned within the enclosure.

Numerous other features, aspects, and advantages of the present invention will become apparent from the following detailed description taken together with the drawing figures.

BRIEF DESCRIPTION OF THE DRAWINGS

The drawings illustrate the best mode currently contemplated of practicing the present invention.

In the drawings:

FIG. 1 is an isometric view of the generator set tank and enclosure constructed according to the present invention;

FIG. 2 is an isometric, exploded view of the generator set tank and enclosure of FIG. 1;

FIG. 5 is a top plan view of the tank of FIG. 1;

FIG. 6 is a front elevation view of the tank of FIG. 5;

FIG. 7 is a right side elevation view of the tank of FIG. 5;

FIG. 8 is a top plan view of an inner enclosure of the tank of FIG. 5;

FIG. 9 is a front elevation view of the inner enclosure of FIG. 8;

FIG. 10 is a right side elevation view of the inner enclosure of FIG. 8;

FIG. 11 is a top plan view of an outer enclosure of the tank of FIG. 1;

FIG. 12 is front elevation view of the outer enclosure of FIG. 11;

FIG. 13 is a right side elevation view of the outer enclosure of FIG. 11;

FIG. 14 is an isometric view of a side panel of the outer enclosure of FIG. 11;

FIG. 15 is an isometric view of an spill containment member piece of the tank of FIG. 5;

FIG. 16 is an isometric view of an adjustable generator support assembly secured to the tank of FIG. 1;

FIG. 17 is an isometric view of a securing channel of the support assembly of FIG. 16;

FIG. 18 is an isometric view of a support platform of the support assembly of FIG. 16;

FIG. 19 is an isometric view of an alternative embodiment of the generator support assembly; and FIG. 20 is an isometric view of a tie-down bracket secured to the tank of FIG. 1.

DETAILED DESCRIPTION OF THE INVENTION

Figure 4:
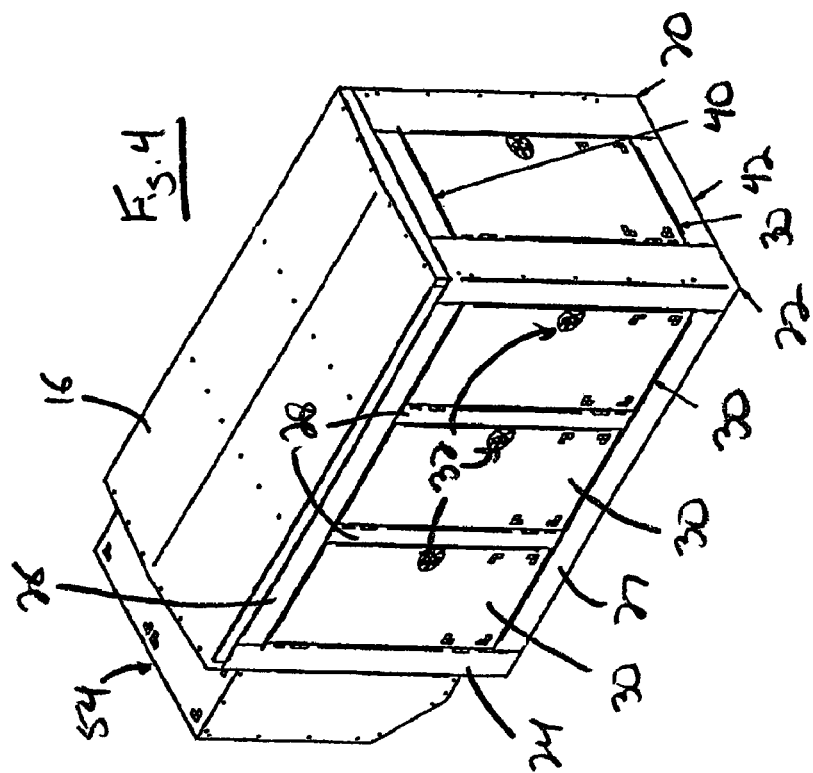
FIG. 4 is an isometric view of the enclosure of FIG. 1.

With reference now to the drawing figures in which like reference numerals designate like parts throughout the disclosure, a generator set assembly is indicated generally at 10 in FIG. 1. The assembly 10 includes a tank 12, and an enclosure 14 secured to the tank 12.

Referring to FIGS. 1-4, the enclosure 14 is formed of a roof panel 16 secured at each corner to a number of corner posts 18, 20, 22, and 24. The posts 18 and 20, and the posts 22 and 24 each define a side panel 25 for the enclosure therebetween that includes a top rail 26, a bottom rail 27, and a pair of vertical support posts 28 extending between the rails 26 and 27. The support posts 28 and the adjacent corner posts 18-24 define a number of apertures 29 therebetween, within which are disposed access doors 30. The access doors 30 are movably disposed within the apertures 29 in any suitable manner, but are each preferably pivotally disposed within the apertures 29 by a pair of hinges 31 secured between the doors 30 and the adjacent corner post 18-24, or support post 28. The doors 30 also each include an openable closure 32 disposed on each door 30 opposite the hinges 31. The closure 32 includes a locking mechanism 34 that is selectively engageable with the adjacent corner post 18-24 or adjacent support post 28 and is actuatable by a handle 35 to enable the doors 30 to be selectively locked and unlocked. Additionally, the access doors 30 each optionally include a containment member 36 secured to the interior surface of the door 30. The containment member 36 defines an open top end 37 and, in conjunction with the associated door 30, forms an enclosure 38 within which any of a variety of items associated with the generator set assembly 10 can be positioned.

The corner posts 20 and 22 define an end panel 39 therebetween having a top rail 40 and a bottom rail 42 between which is located on access door 30 constructed similarly to the doors 30 located on each of the side panels 25. Door 30 is framed between the corner posts 20 and 22 and between the top rail 40 and bottom rail 42 that extend between the corner posts 20 and 22 on opposite sides of the door 30. The door 30 also includes a hinge 31 and a closure 32 including a locking mechanism 34 and handle 35 to allow the door 30 to be selectively opened and closed.

Figure 3:
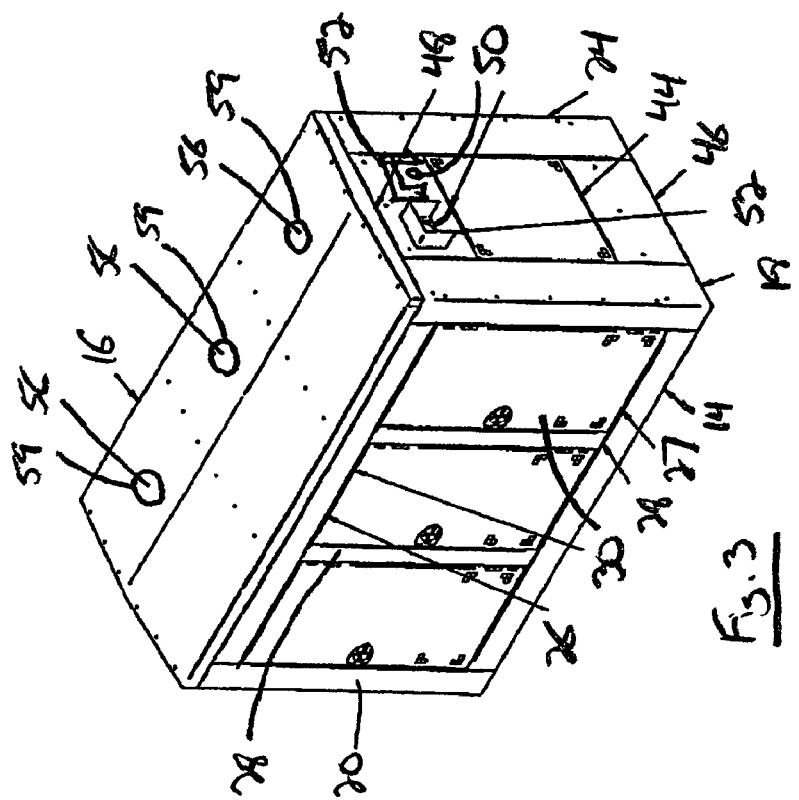
FIG. 3 is an isometric view of the enclosure of FIG. 1.

As best shown in FIGS. 1-3, an exhaust grill 44 is mounted opposite end panel 39, between the corner posts 18 and 24, to provide an outlet for the exhaust gases generated by the generator, motor, and radiator (not shown) disposed within the enclosure 14 to be directed outwardly from the enclosure 14. A bottom panel 46 is positioned between the posts 18 and 24 below the exhaust panel 44, and a top panel 48 is located between the corner posts 18 and 24 above the exhaust panel 44. The top panel 48 also includes a number of vent openings 50 therein that are covered by rain guards 52. The vent openings 50 can be formed by removing knockout sections (not shown) formed in the top panel 48 in order to provide as many openings 50 as needed, or the openings 50 can be preformed in the top panel 48. Each vent opening 50 is connectable to an exhaust pipe (not shown) extending from the generator or one of the other generator components located within the enclosure 14. The vent openings 50, rain guards 52, and exhaust panel 44 may also preferably be enclosed by a cover or hood 54 secured to the corner posts 18 and 24, and to the bottom panel 46 and top panel 48 to completely enclose the exhaust openings, i.e. the exhaust panel 44 and vent openings 50. The hood 54 is preferably secured to the enclosure 14 when the unit is not in use in order to provide protection for the exhaust grill 44, the vent openings 50, and rain guards 52, such as during transportation of the assembly 10.

Looking now at FIG. 3, the roof panel 16 may also include a number of separable knockout portions 56 that are preferably circular in shape. These portions 56, when removed, each define a generally a circular aperture 59 in the roof panel 16. The apertures 59 are each adapted to receive a sound muffler (not shown) that can be operably connected to the generator to be utilized with the assembly 10.

Referring now to FIGS. 1-2 and 5-15, the tank 12 supporting the enclosure 14 is formed of an outer enclosure 58 within which is disposed an inner enclosure 60 to form a double-walled container tank 12. Looking at FIGS. 5-7 and 11-14, the outer enclosure 58 includes a pair of side panels 62, best shown in FIG. 14, that extend along each side of the outer enclosure 58. The side panels 62 are joined by a pair of end panels 64 and 66 along with a bottom panel 70 extending between the side panels 62 and the end panels 64 and 66 to form an interior 68. Each of the panels 62-70 are formed of a durable fluid-proof material, such as a metal, and are secured to one another in any suitable manner, such as by welding, to form the fluid-tight outer enclosure 58. In the configuration for the outer enclosure 58 shown in the drawing figures, the end panel 64 extends between adjacent ends of each side panel 62, while the end panel 66 spaced inwardly along the side panels 62 from the opposite ends of the side panels 62. The ends of the side panels 62 adjacent the end panel 66 are connected by a removable screen 72 to form or an open or stub-up area 74 between the screen 72 and the end panel 66. The area 74 is open both at the top and the bottom of the area 74, as the bottom panel 70 also terminates at the end panel 66. Thus, the area 74 allows for various connecting conduits (not shown) between the tank 12, the generator or generator components, and/or other external devices or connections, such as a power inlet, to be routed through the area 74.

Each side panel 62 also includes a tie-down opening 76 disposed between the screen 72 and the end panels 66 near the lower end of the side panel 62 in communication with the stub-up area 74. The opening 76 allows the outer enclosure 58 and, consequently, the tank 12, to be secured to a surface (not shown) on which the tank 12 is positioned, such as for transport, in a conventional manner. Additionally, the outer enclosure 58 can include separate, removable tie-down brackets 77 secured to opposite ends of the end panel 64, and optionally also to the screen 72. Each bracket 77, as best shown in FIG. 20, includes a securing portion 77a attachable to the end panel 64, the screen 72, or optionally to the side panels 62 using suitable fasteners (not shown), and an eyelet 77b, extending outwardly from the securing portion 77a. The eyelet 77b functions identically to the opening 76 to enable a rope, cable, or chain (not shown) to be passed therethrough and used to anchor the outer enclosure 58 and the tank 12 to a surface.

Furthermore, the bottom panel 70 of the outer enclosure includes a pair of U-shaped ribs or channels 78 disposed on and extending across the bottom panel 70 between the side panels 62. The bottom channels 78 are spaced from one another, and are spaced from the respective end panels 64, 66 and function to engage and position the inner enclosure 60 a distance above the bottom wall 70 a distance equal to the height of the channels 78. This spaces the bottom surface 70 of the outer enclosure 58 and inner enclosure 60 from one another, providing the double-walled configuration for the bottom of the tank 12.

Looking now at FIGS. 5 and 11, each of the side panels 62 includes a bottom flange 80 and a top flange 81 extending along the length of the side panels 62. Flanges 80, 81 are used in connecting the side panels 62 to the end panels 64, 66 and bottom panel 70, such as by welding, to form the outer enclosure 58. Each side panel 62 also includes a number of mounting openings 82 in the panel 62 disposed adjacent the top flange 81, and a number of separate mounting openings 83 located directly in the top flange 81. The openings 83 are located in the top flange 81 at locations corresponding to the locations of the respective corner posts 18-24 such that suitable fasteners (not shown) can be inserted through the openings 83 in the flange 81 and into the corner posts 18-24, to secure the posts 18-24 and the enclosure 14 to the outer enclosure 58 of the tank 12.

Looking now at FIGS. 5-10, the inner enclosure 60 is formed with a top wall 84, a bottom wall 86, a pair of opposed end walls 88 and 90 extending between the top wall 84 and bottom wall 86, and a pair of side walls 92 and 94 extending between the end walls 88 and 90, and also between the top wall 84 and bottom wall 86. Each of the walls 84-94 are formed of a durable fluid-proof material, such as a metal, and are secured to one another in any suitable manner, such as by welding, to form the fluid-tight inner enclosure 60. The inner enclosure 60 also preferably includes a number of internal baffles 95 that partition the interior of the inner enclosure 60 and provide additional structural support to the inner enclosure 60.

The top wall 84 is formed with a number of fittings able to be connected to the various components of the generator mounted to the tank 12. The fittings include an emergency vent fitting 96, a fuel fill fitting 98, a normal vent fitting 100 on level gauge fitting 101, and spill fill containment fitting 102. Each of these fittings 96-102 are located on the top wall 84 adjacent the end 90, and are each utilized regardless of the type or size of the generator mounted to the tank 12. The top wall 84 of the enclosure 60 also includes a number of fittings which are capable of being selectively utilized depending on the particular size of the generator utilized with the tank 12. For example, the top wall 84 includes a pair of fittings 104 for a removable fuel return diptube 107a that are each positioned adjacent one of the side walls 92 and 94, and a pair of fittings 106 for receiving a removable diptube 107b for fuel supply disposed adjacent each side wall 92 and 94 near the adjacent fittings 104. Additionally, the top wall 84 includes two (2) opposed pairs of fittings 108 and 109 that can be adapted for a particular customer use, and a fitting 110 configured for a level switch. Thus, the fittings 104-109 are, in essence, duplicated on the top wall 84 of the inner enclosure 60 such that one of each pair of the respective fittings 104-109 will be exposed and able to be utilized with a particular size generator mounted to the tank 12.

The top wall 84 of the inner enclosure 60 is formed to have dimensions that enable the top wall 84 to extend past each of the end walls 88 and 90, and past the side walls 92 and 94 to form a pair of outwardly extending end flanges 111 and 112 that extend outwardly over the respective end walls 88 and 90, and a pair of side flanges 113 and 114 that extend outwardly from the side walls 92 and 94. Each of the flanges 111-114 is present in order to enable the inner enclosure 60 to be properly positioned within and secured to the outer enclosure 58 to form the double-walled tank 12. More particularly, when the inner enclosure 60 is positioned within the outer enclosure 58, the end flanges 111 and 112 are located directly above the end panels 64 and 66 of the outer enclosure 58, and the side flanges 113 and 114 are disposed against the side panels 62, such that each flange 111-114 can be secured to the corresponding part of the outer enclosure 58 in a suitable manner, such as by welding. Additionally, end flange 112 defines a second emergency vent fitting 116 that is in communication with the interior 68 of the outer enclosure 58, while end flange 111 defines an opening 118 for use with a top mounted leak detection mechanism (not shown) also in communication wit the interior 68. The flanges 111-114 are each properly positioned with respect to the side panels 62 and end panels 64 and 66 as a result of the placement of the channels 78 within the outer enclosure 58 to ensure that the top wall 84, and flanges 111-114 thereon, is positioned level with the upper ends of end panels 64 and 66. This alignment is also achieved by the location of a positioner 120 on end wall 90 of the inner enclosure 60. The positioner 120 is visually alignable with a corresponding window 122 located in the end panel 64 of the outer enclosure 58 in order to provide an additional mechanism for properly aligning the inner enclosure 60 within the outer enclosure 58 to form the double-walled tank 12.

Referring now to FIGS. 5, 6, and 15, the tank 12 also includes a pair of spill containment members 124 positioned over and secured to the top wall 84 of the inner enclosure 60 and to each side panel 62 of the outer enclosure 58. The spill containment members 124 are each formed of a generally L-shaped piece of durable, waterproof material, such as a metal, that is secured between the side panels 62 and to the top wall 84 of the inner enclosure 60, such as by welding, in order to provide a spill barrier on the top of the tank 12 in conjunction with the side panels 62. The containment members 124 are each secured to be flush with the top flanges 81 of each side panel 62 and include a number of openings 125 that can be used as an additional attachment point for the generator or a generator component positioned above the respective members 124. Thus, any fuel that is spilled onto the top wall 84 is retained on the tank 12 by the containment members 124 and the side panels 62.

Looking now at FIGS. 5-7 and 16-18, a pair of generator support assemblies 126 are positioned over the top wall 84 of the inner enclosure 60 and between the side panels 62 of the outer enclosure 58. Each assembly 126 includes a mounting channel 130 within which is movably mounted a pair of support platforms 132. The mounting channel 130 is generally rectangular in shape and is formed with a pair of upturned, opposed side flanges 134 and a pair of upturned opposed end flanges 136. The end flanges 136 each include a pair of apertures 138 therein that enable the end flanges 136, and consequently the mounting channels 130, to be secured to the side panels 62 at a number of different locations using suitable fasteners (not shown) inserted through the openings 80 in the side panel 62 and the apertures 138 in the end flanges 136. Additionally, the side flanges 134 include opposed pairs of openings 140 disposed adjacent each of the end flanges 136. The openings 140 are alignable with similarly shaped openings 142 disposed in opposed flanges 144 of each support platform 132. Thus, by using suitable fasteners (not shown), the platforms 132 can be affixed to the side flanges 134 at various positions to accommodate the particular generator being mounted to the tank 12. The support platforms 132 also each include a generally flat top surface 146 extending between the opposed flanges 144 that includes a central opening 148 that is capable of receiving a bolt or other fastener used to secure the generator or generator component directly to the platform 132. Thus, the platforms 132 can be mounted between the side flanges 134 at varied positions in order to accommodate generators and generator components of varying types and sizes. The number and location of the various openings in each of the side panels 62, side flanges 134, end flanges 136, and flanges 144 can be varied as necessary to provide multiple configurations for the generator support assemblies 126 in order to enable the assemblies 126 to accommodate a wide variety of sizes and types of generators. In a particularly preferred embodiment, the openings allow for the support assemblies 126 to be secured to the side panels 62 in two (2) distinct configurations for accommodating generators in a first range for 20 Kw to 80 Kw size generators, and in a second range for 100 Kw to 230 Kw size generators.

Furthermore, in a second embodiment shown in FIG. 19, the generator support assembly 150 includes a support platform 152 which has a top surface 154 including a number of central openings 156 to which a generator or generator components of varying sizes can be secured. Additionally, the platform 152 can include flanges 158 on opposed sides of the top surface 154 that include a number of openings 160 selectively alignable with an aperture 162 in each of the side flanges 134 of the securing channel 130 to enable the platform 152 to be adjustably positioned within the assembly 150.

Various alternatives are contemplated as being within the scope of the following claims particularly pointing out and distinctly claiming the subject matter regarded as the invention.

We hereby claim:

1. A tank adapted for use in forming a generator set, the tank comprising:
   a) at least one side wall including a pair of aligned flanges disposed adjacent a top end of the at least one side wall;
   b) a pair of end walls connected to each end of the at least one side wall to form the tank therebetween; and
   c) at least one generator support assembly disposed between the pair of aligned flanges, the assembly including a mounting member adjustably secured between the pair of aligned flanges, and a platform adjustably positioned on the mounting member and adapted to be secured to a generator mounted to the tank.

2. The tank of claim 1 further comprising a pair of spill containment members secured to the at least one side wall between the pair of flanges.

3. The tank of claim 1 further comprising a number of pairs of fittings disposed on the at least one side wall between the pair of aligned flanges.

4. The tank of claim 1 further comprising a first generator support assembly disposed and adjustably secured between the pair of aligned flanges and a second generator support assembly disposed and adjustably secured between the pair of aligned flanges and spaced from the first generator support assembly.

5. The tank of claim 1 wherein the tank includes a bottom wall, a pair of end walls extending upwardly from opposed ends of the bottom wall, a first side wall extending upwardly from the bottom wall between the pair of end walls, a second side wall extending upwardly from the bottom wall between the end walls opposite the first side wall, and a top wall connected between the end walls and the first and second side walls opposite the bottom wall, and wherein the pair of aligned flanges are formed along each of the first and second side walls and adjacent the top wall.

6. The tank of claim 5 wherein the top wall is connected to an inner enclosure that is disposed within an outer enclosure formed from the top wall, the bottom wall, a pair of end walls, the first side wall and the second side wall.

7. The tank of claim 5 wherein each of the pair of aligned flanges includes a number of first openings alignable with a number of first apertures in the mounting member of the at least one generator support assembly.

8. The tank of claim 7 wherein each of the aligned flanges includes a number of second openings spaced from the first openings and alignable with mounting apertures in a mounting member of second generator support assembly.

9. The tank of claim 1 wherein the platform includes a number of platform apertures alignable with a number of mounting bars in the mounting member.

10. A mounting for a generator set, the mounting comprising:
    a) a tank including a pair of rails extending along an upper end of the tank;
    b) a first generator support assembly positioned between the pair of rails, the first assembly including a mounting member adjustably secured between the pair of rails, and a platform adjustably secured to the mounting member; and
    c) an enclosure secured to the tank over the first generator support assembly.

11. The mounting of claim 10 further comprising a number of access doors disposed around the periphery of the enclosure.

12. The mounting of claim 11 wherein the enclosure includes a roof panel a pair of opposed side panels extending downwardly from the roof, and a pair of end panels extending downwardly from the roof between the side panels, and wherein each of the opposed side panels includes multiple access doors.

13. The mounting of claim 12 further comprising an access door in one of the end panels.

14. The mounting of claim 13 further comprising at least one exhaust opening disposed on the other of the end panels.

15. The mounting of claim 14 wherein the at least one exhaust opening is an exhaust grill.

16. The mounting of claim 14 wherein the at least one exhaust opening is an exhaust vent.

17. The mounting of claim 14 further comprising a cover releasably secured to the other of the end panels over the at least one exhaust opening.

18. A method for mounting a generator to a generator set mounting, the method comprising the steps of:
    a) providing a generator set mounting including a mounting tank including a pair of opposed rails extending along an upper end of the tank, a first generator support assembly positioned between the pair of rails, the first assembly including a mounting member adjustably secured to the pair of rails and a platform adjustably secured to the mounting member, and an enclosure securable to the tank over the first generator support assembly;
    b) securing the at least one generator support assembly to the tank;
    c) securing the generator to the at least one first generator support assembly; and
    d) securing the enclosure to the tank over the generator and the at least one generator support assembly.

19. The method of claim 18 wherein the step of securing the at least one generator support assembly to the tank comprises the steps of:
    a) securing a first generator support assembly to the tank; and
    b) securing a second generator support assembly to the tank.

20. The method of claim 18 wherein the step of securing the at least one generator support assembly to the tank comprises the steps of:
    a) securing the platform to the mounting member; and
    b) securing the mounting member to each of the pair of rails.

21. The method of claim 18 wherein the step of securing the at least one generator support assembly to the tank comprises the steps of:
    a) securing the mounting member to each of the pair of rails; and
    b) securing the platform to the mounting member.

* * * * *